United States Patent [19]

Nonoshita et al.

[11] Patent Number: 5,453,845
[45] Date of Patent: Sep. 26, 1995

[54] APPARATUS FOR PROVIDING VARIABLE GAMMA CORRECTION IN BOTH ON-LINE AND OFF-LINE MODES OF OPERATION

[75] Inventors: Hiroshi Nonoshita, Yokohama; Kenjiro Cho, Tokyo; Seiji Saito, Yokosuka; Yasuhisa Shigehara, Tokyo, all of Japan

[73] Assignee: Canon Kabushiki Kaisha, Tokyo, Japan

[21] Appl. No.: 235,132

[22] Filed: Apr. 28, 1994

Related U.S. Application Data

[63] Continuation of Ser. No. 754,305, Sep. 4, 1991, abandoned, which is a continuation of Ser. No. 401,568, Aug. 29, 1989, abandoned, which is a continuation of Ser. No. 110,783, Oct. 21, 1987, abandoned.

[30] Foreign Application Priority Data

Oct. 27, 1986 [JP] Japan ................................... 61-255104
Oct. 27, 1986 [JP] Japan ................................... 61-255122

[51] Int. Cl.$^6$ .................................................. H04N 1/40
[52] U.S. Cl. ........................ 358/442; 358/406; 358/455; 348/674
[58] Field of Search ....................... 348/661, 674, 348/680, 254; 358/403, 406, 408, 455, 458, 460, 518, 519, 521, 523, 443, 448, 442, 296; 395/109, 114; H04N 1/00, 1/40

[56] References Cited

U.S. PATENT DOCUMENTS

| | | | |
|---|---|---|---|
| 4,394,688 | 7/1983 | Iida et al. ................................ | 358/164 |
| 4,539,593 | 9/1985 | Jufier et al. .............................. | 358/166 |
| 4,672,466 | 6/1987 | Schimpf ................................... | 358/284 |
| 4,680,641 | 7/1987 | Nakazawa ................................ | 358/280 |
| 4,827,349 | 5/1989 | Ogata et al. ............................. | 558/442 |

FOREIGN PATENT DOCUMENTS 0006576 1/1981 Japan .................................... 358/164

OTHER PUBLICATIONS

Haines, Fredrick J. "Understanding Gamma Correction" Video Systems pp. 20–24.

Jay, Frank, "IEEE Standard Dictionary of Electrical and Electronics Terms" Institute of Electronics and Electrical Engineers, p. 419 1984.

Dhake, Arvind M. "Television Engineering" Tata McGraw-Hill Publishing Co. 1980 pp. 73–75.

*Primary Examiner*—David E. Harvey
*Attorney, Agent, or Firm*—Fitzpatrick, Cella, Harper & Scinto

[57] ABSTRACT

An image processing apparatus is disclosed which includes circuitry for selectively applying variable gamma corrections to an image signal during both on-line and off-line modes of operation. In the off-line mode, the apparatus operates to simultaneously correct image signals for non-linearities produced by both an input device and an output device. In the on-line mode, correction is made for the non-linearities of the input device and a separate correction is made for the non-linearities of the output device. Such operation allows the apparatus to process linear data in the on-line mode.

21 Claims, 6 Drawing Sheets

ORIGINAL IMAGE

Z = 1

BINARY EXPRESSION
THRESHOLD = 8
16 DENSITY LEVELS
OF 0~F

Z = 4

MULTIVALUE
EXPRESSION
16 DENSITY
LEVELS OF
0~F

PRINTER γ-CHARACTERISTIC

γ CORRECTION TABLE

APPARATUS FOR PROVIDING VARIABLE GAMMA CORRECTION IN BOTH ON-LINE AND OFF-LINE MODES OF OPERATION

This applicatino is a continuation of application Ser. No. 07/754,305 filed Sep. 4, 1991, which was a continuation of application Ser. No. 07/401,568 filed Aug. 29, 1989, which was a continuation of application Ser. No. 07/110,783 filed Oct. 21, 1987, all now abandoned.

BACKGROUND OF THE INVENTION

1. Field of the Invention

The present invention relates to an image processing system for processing in particular an intermediate tone image.

2. Related Background Art

Recent development of image processing technology with computers has enabled computerized creation, editing, storage etc., of images such as those for printed matter.

In general such an image is composed of pixels each represented by "0" or "1", and such image is called a binary image. Images composed of characters and patterns can be satisfactorily represented by binary digitizing with a suitable threshold level, but images involving intermediate tone, such as photographs, generally require 4 to 8 bits per pixel for reproducing the intermediate tone. Such images are called multivalue images.

FIG. 1A shows an original image with intermediate tone, and FIG. 1B shows an example of binary digitization with a threshold value at a half level, for example a level "8" if the original image has 16 levels, wherein each pixel is represented by one bit, namely "1" (black) or "0" (white). FIG. 1C schematically shows a thus binary digitized image in which each pixel is represented by a block. In this case the image is represented by two-dimensional information with $z=1$.

FIG. 1D shows a representation of the original image of FIG. 1A by multivalue data of 16 density levels O–F. FIG. 1E is an explanatory view of the image information of multivalue data, in which each pixel is represented by four blocks or four bits.

A printer or a display unit connected to an image processing system is considered as a fixed factor in the system, and the image information can be subjected to a fixed gamma correction in the system, in consideration of the input-output characteristic or gamma characteristic of such output equipment. This is an important factor in handling multivalue images. For example, in order to obtain a satisfactory display on a cathode ray tube with data from a television camera, said data may be gamma corrected in consideration of the fixed gamma characteristic of said cathode ray tube. However, if such data from the television camera are directly printed, there may be obtained an unsatisfactory printout with a poor contrast, since the data are not matched with the gamma characteristic specific to the printer. In such case, a proper print can be obtained if a gamma correction is made according to the gamma characteristic of the printer. However such system can only work with predetermined input/output equipment, and will have no adaptability to other equipment.

In practice, however, the equipment to be connected to the system is often changed and should preferably be variable. Also, in the case of an image output at another terminal through a local area network, the characteristic of such terminal is generally not known.

On the other hand, each piece of equipment constituting the system, such as an input or output unit, is generally expensive, so that the entire system will become expensive if the efficiency of use of such equipment is low. For example, a scanner/printer terminal may also be used as a copying machine in off-line mode, in order to improve the efficiency of use. However, particularly when multivalue data are involved, gamma correction becomes a serious problem as explained above, if a terminal is used as an off-line copying machine as well as an on-line image output unit, or if the input and output units are variable, or if plural units are simultaneously connected to the system. In summary the system should execute image processing regardless of the gamma characteristic of the equipment connected thereto, and, in the case of off-line mode, should execute a gamma correction according to the terminals to be connected. It therefore becomes a serious factor when and where to effect the gamma correction, in consideration of the number and nature of the units of input and/or output equipment, in the off-line mode or in the on-line mode. For the purpose of matching the data with a destination terminal, a technology for varying the resolving power according to said terminal is already disclosed in a copending application Ser. No. 658,760 filed Oct. 9, 1984, assigned to the same assignee.

SUMMARY OF THE INVENTION

In consideration of the foregoing, an object of the present invention is to provide an image processing system, different from the conventional systems for binary data, capable of handling multivalue data.

Another object of the present invention is to provide an image processing system capable of maintaining a gamma characteristic $\gamma \approx 1$ on a system bus regardless of the properties of the equipment to be connected to the system.

Still another object of the present invention is to provide an image processing system which does not effect gamma correction in the case of image processing in the system, but effects gamma correction in the case of image output from the system.

Still another object of the present invention is to provide an image processing system capable of effecting gamma correction between a scanner and a printer according to the properties thereof in the case of an off-line mode, and conducting image processing with a condition $\gamma \approx 1$ on the system bus in the case of an on-line mode.

DETAILED DESCRIPTION OF THE PREFERRED EMBODIMENTS

Now the present invention will be clarified in detail by explanation of the preferred embodiments thereof, shown in the attached drawings.

At first it is to be noted that the image processing system of the present invention is entirely different from the conventional system for handling binary data or those for reproducing intermediate tone by pseudobinary signals.

Figure 1A:
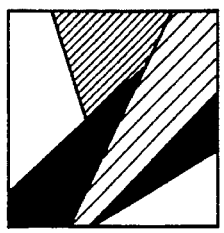
FIGS. 1A to 1E are schematic views of binary and multivalue representations of an original image.
Figure 1C:
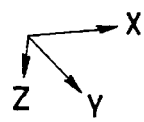
Figure 1C:
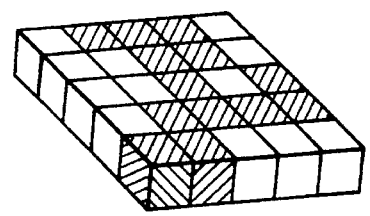
Figure 1B:
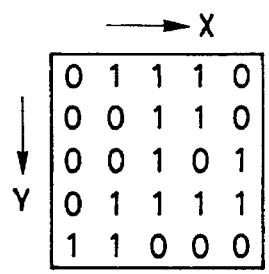
Figure 1E:
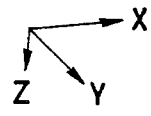
Figure 1E:
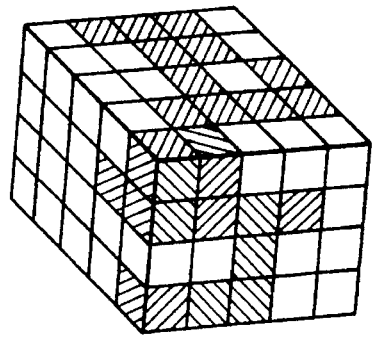
Figure 1D:
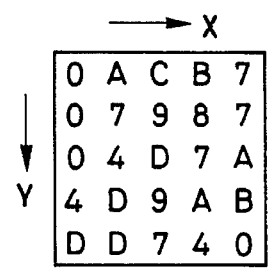
Figure 2:
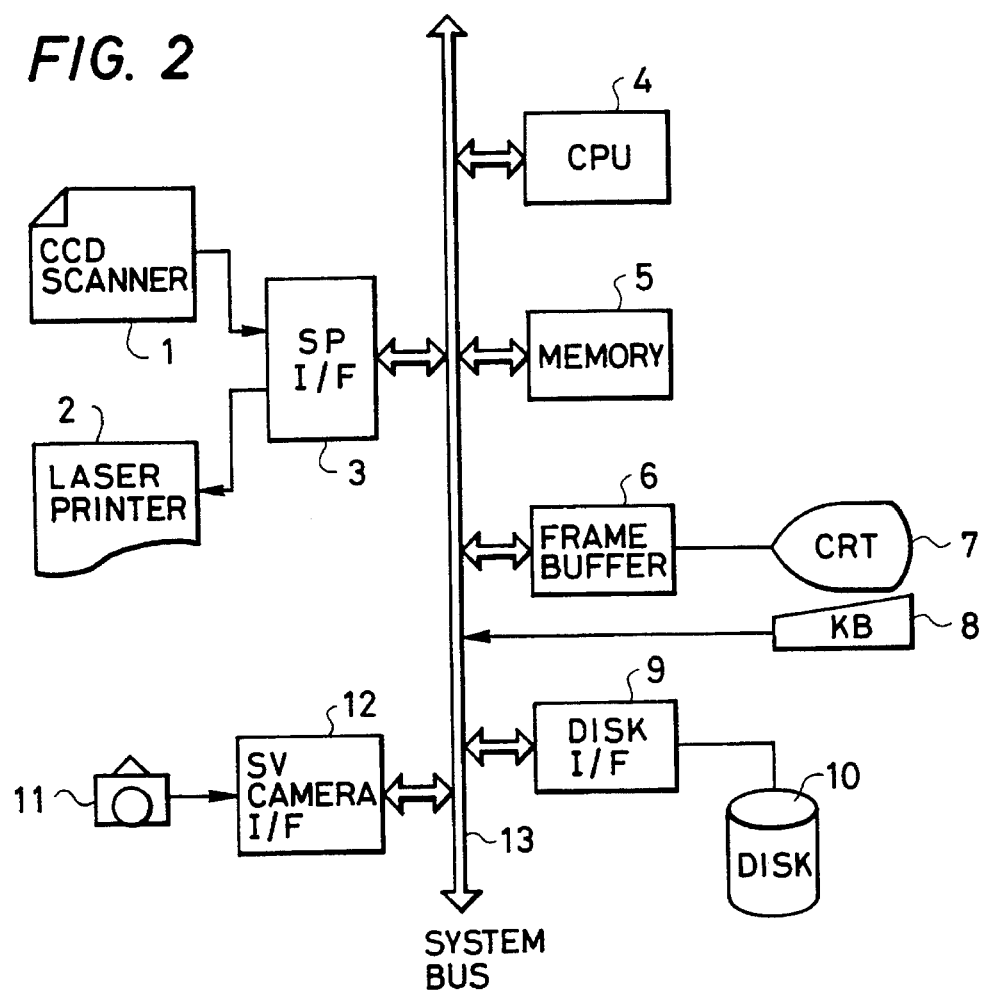
FIG. 2 is a block diagram of an image processing system in which the present invention is applicable.

FIG. 2 is a block diagram of an image processing system embodying the present invention. There are provided, as tonal image input units, a CCD scanner 1 for photoelectric conversion of an original image with a one-dimensional CCD array and a still video (SV) camera 11 for entering the image of a three-dimensional object with a two-dimensional CCD array, and, as tonal image output units, a laser beam printer 2 for tonal image output with pulse width modulation and an electrophotographic process, and a cathode ray tube 7.

Figure 6:
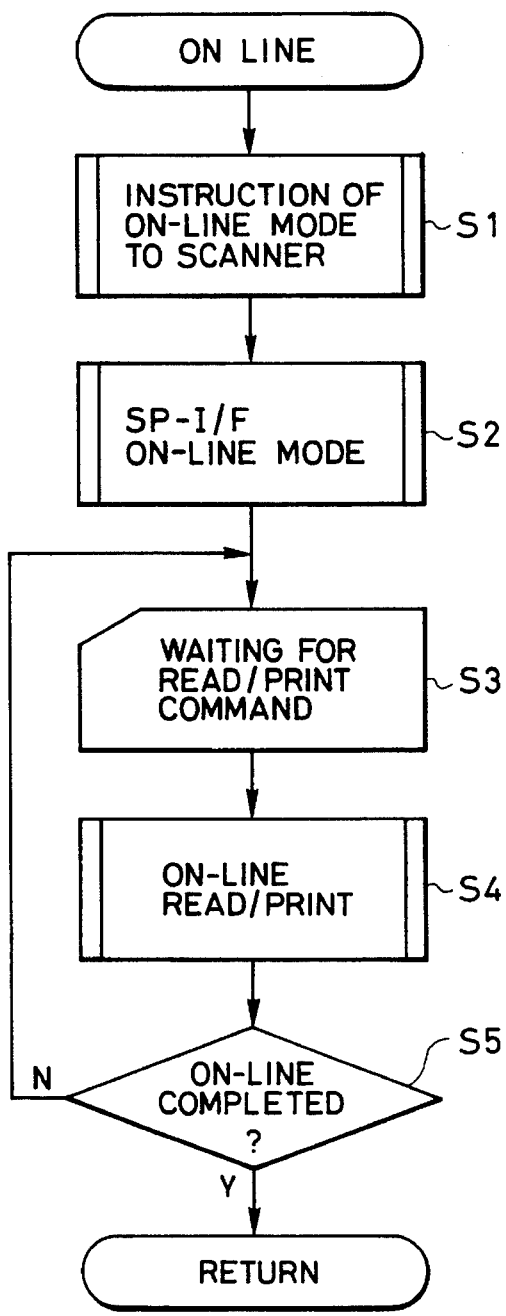
FIG. 6 is a flow chart of a control sequence in an on-line mode.
Figure 7:
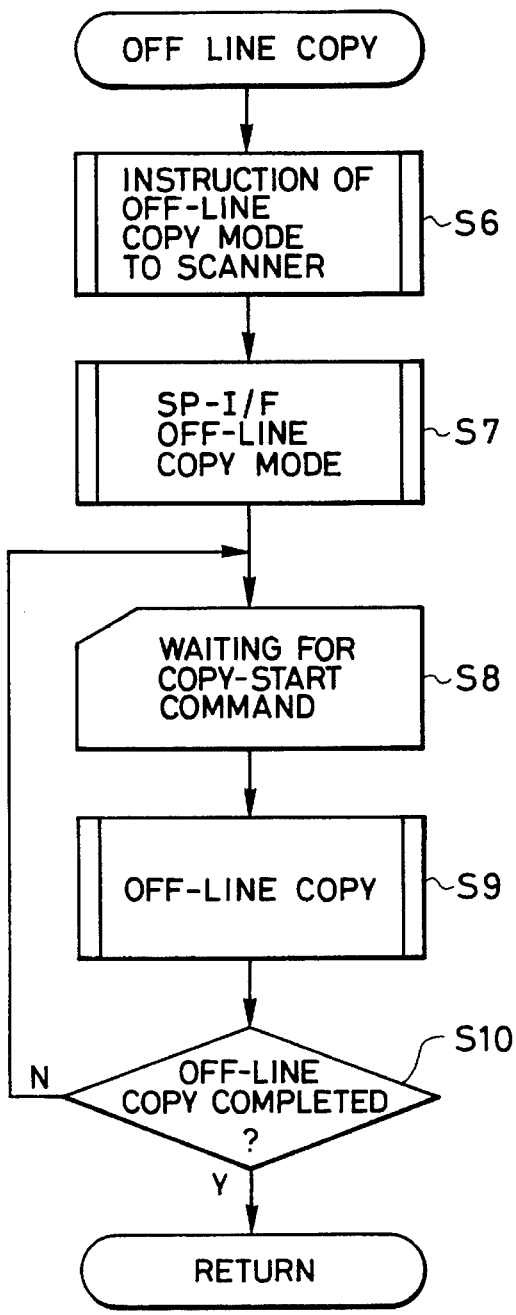
FIG. 7 is a flow chart of a control sequence in an off-line copy mode.

In addition the system is provided with a central processing unit (CPU) 4; a memory 5 for storing programs or image data; a frame buffer for storing an image to be displayed on the cathode ray tube 6; a keyboard 8 constituting an input unit for the operator; a disk 10 for storing programs shown in FIGS. 6 and 7 and image data; a disk interface 9 for connection with said disk 10; a printer-scanner interface 3 for connection of the CCD scanner 1 and the printer 2; and an SV camera interface 12 for connecting the SV camera 11.

In the following there will be explained the flow of data in case, as an example, of processing an original image followed by printer output.

At first tonal image data, converted into electrical signals by the CCD scanner 1, are supplied to the system through the scanner-printer interface (SP-I/F) 3, and stored in the form of multivalue digital data in the memory 5. Said image can be transferred to the frame buffer 6 and monitored on the cathode ray tube 7. Watching said monitor image, the operator enters an instruction for the required image processing through the keyboard 8, and the CPU 4 executes the image processing accordingly. The image processing mentioned above can be image extraction, edge enhancement, density conversion, contrast correction or any other processing. For image output, the image data in the memory 5 are then supplied through the SP-I/F 3 to the laser beam printer 2.

As the CCD scanner 1 and the printer 2 are both of scanning type, there may be employed a common interface. Also the scanner-printer interface 3 may be so constructed as to connect the scanner and the printer therein, thereby enabling direct copying of the original image without introducing the image data into the system.

Figure 3:
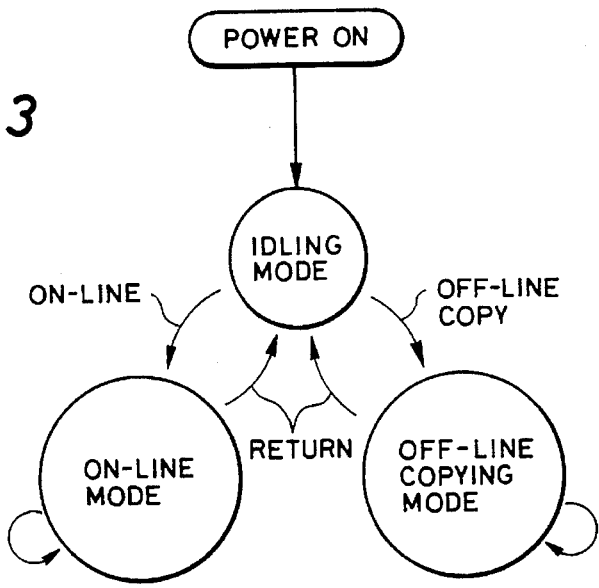
FIG. 3 is a schematic view showing transition between on-line and off-line states.

It is therefore rendered possible to utilize the scanner and the printer for a local copying operation while the system is executing another process, and thus to improve the efficiency of use of the input and output equipment. FIG. 3 shows the transition between the on-line mode and the off-line mode.

In FIG. 3 there are shown an idle mode, an on-line mode and an off-line mode. After the start of power supply, the system assumes the idle mode, and is shifted to the on-line mode in response to an instruction therefor. In said mode the image data are exchanged between the CPU and the scanner or printer. The system returns to the idle mode by a return instruction. In response to an off-line copy instruction, the system enters the off-line copy mode in which the scanner and the printer are directly connected for a copying operation. Then the system returns to the idle mode by a return instruction.

Figure 4A:
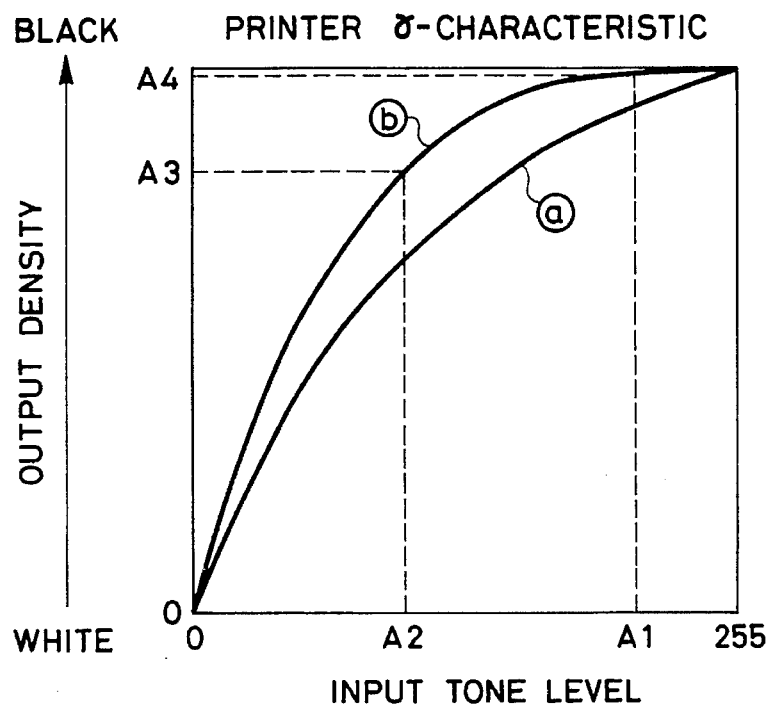
FIGS. 4A and 4B are views showing the relationship between the gamma characteristic of a printer and a gamma correction table.

In such system the gamma correction is an important factor as explained before. Each image input or output equipment has a specific input-output (gamma) characteristic, and the difference in said characteristic will become even greater if these pieces of equipment are supplied by different manufacturers, though they may be mutually matched if they are supplied by the same manufacturer. FIG. 4A shows an example of the input-output characteristic of a printer.

For image output, there is required a gamma correction including the input and output systems. However, in a case of introducing the image data into the system and processing said data, a proper processing has to be made on linear data ($\gamma \approx 1$) independent of the characteristics of the input and output equipment, or on data having a unified imaginary gamma.

Figure 4B:
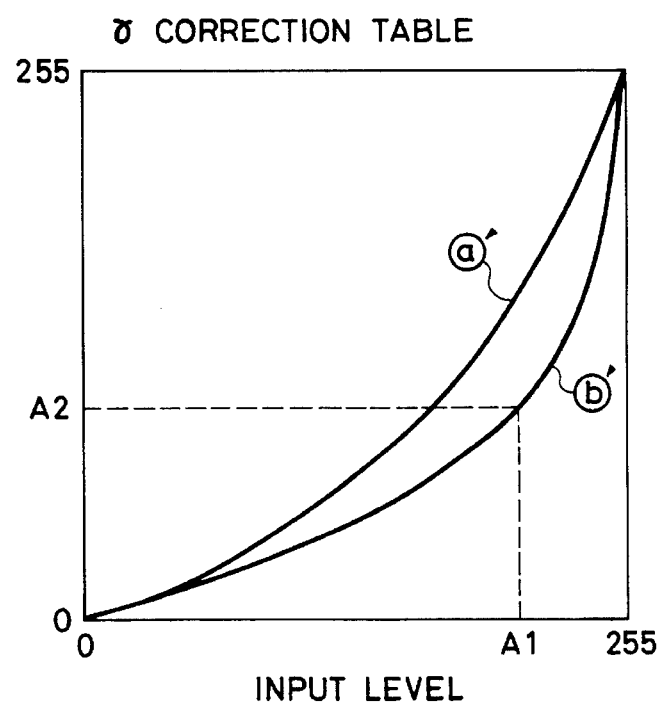

In the following there will be explained the input-output characteristic of the printer shown in FIG. 4A and a corresponding gamma correction table, shown in FIG. 4B, stored in a gamma correction circuit in FIG. 5. For a gamma characteristic (a) or (b) shown in FIG. 4A, an input level A1 will only provide an almost black image represented by A4. It is assumed, for the gamma characteristic (b), that an output density A3 is adequate for an input A1. In such case, the gamma correction table is so constructed as to provide an output level A2 in response to an input A1 according to a curve (b'). In this manner the printer can provide an approximately linear output in response to the input.

Figure 5:
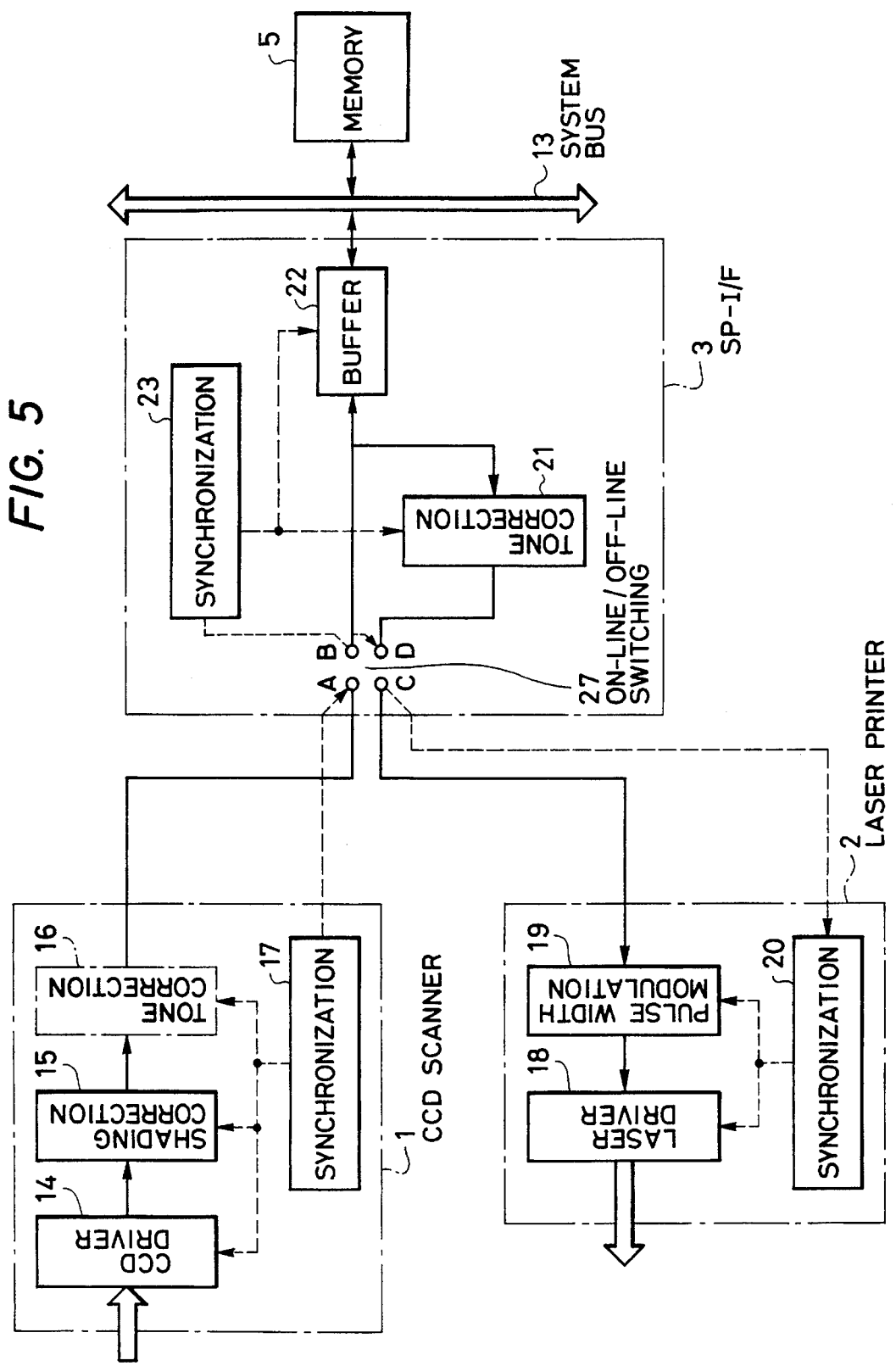
FIG. 5 is a detailed view of an interface 3, a scanner 1 and a printer 2 shown in FIG. 2.

FIG. 5 shows a circuit for effecting gamma conversion.

The CCD scanner 1 is composed of a CCD driver 14 for converting light intensity into an electrical signal by photoelectric conversion; a shading correction circuit 15 for compensating for the difference in the light amount between the central and end portions of the CCD array; a tone control circuit 16 having a gamma correction table or an inverse gamma correction table; and a synchronization circuit 17 for controlling the timing of the input system. However said tone control circuit 16 may be provided in the scanner-printer interface to be explained later. The laser beam printer 2 is composed of a pulse width modulation circuit 19 for converting tonal data into variable pulse width date; a laser driver 18 for on-off control of the laser beam; and a synchronization circuit 20 for controlling the timing of the output system. The scanner-printer interface 3 is composed of a switch 27 for selecting the on-line or off-line mode; a tone correction circuit 21 having a gamma correction table or an inverse correction table; a synchronization circuit 23 for synchronization with the input and output equipment; and a buffer 22 for data transfer between the input or output system and the system; and is connected to a system bus 13 through said buffer 22.

In the present invention, in a case of off-line copy mode, there is conducted a correction including the input and output systems, utilizing the tone correction table in the tone correction circuit 16 in the scanner (switch 27 connected A–C). In a case of data input in the on-line mode (switch 27 connected A–B), the tone correction table in the tone correction circuit 16 in the scanner is switched to effect correction for the input system only (inverse gamma correction)

to provide the system with linear data of γ≈1. As already explained before, the tone correction circuit 16 may be provided in the scanner-printer interface to achieve the above-explained function. Also, in a case of data output from the system, the tone correction table is switched in the interface (tone correction circuit 21 in FIG. 4) to effect gamma correction for the output system only (switch connected C–D).

FIG. 6 shows a process flow in the on-line mode. When the on-line mode is assumed in response to a key instruction from the operator, an on-line mode instruction is given to the scanner 1 to shift the same to the on-line mode, whereupon the tone correction table in said scanner is switched to one for the on-line mode as explained in relation to FIG. 5 (step S1). Then the switch 27 in the SP-I/F 3 is shifted to a state for the on-line mode (A–B, C–D) to enable data exchange between the CPU and the scanner 1 or printer 2 (step S2). Subsequently a step S3 awaits a read command from the scanner 1 or a print command to the printer 2, and a step S4 executes the data input or output. When the on-line process is terminated (step S5), the flow returns to the idle mode in response to a return command.

FIG. 7 shows a process flow in the off-line copy mode. When the off-line copy mode is assumed in response to an off-line instruction, an off-line instruction is given to the scanner 1 to shift the same to the off-line mode, whereupon the tone correction table in the scanner is shifted to one for the off-line copy mode as already explained in relation to FIG. 5 (step S6). Then the switch 27 in the SP-I/F is shifted to an off-line state (A–C) to directly connect the scanner and the printer, thereby enabling the copying operation (step S7).

Then a step S8 awaits a copy start command, and a step S9 executes a copying operation. Upon completion of the off-line copying operation (step S10), the sequence returns to the idle mode by a return command.

The printer does not require mode switching as it functions in the same manner in both modes.

In the foregoing there has been explained the gamma correction among the scanner, printer and image processing system in the on-line or off-line mode thereof. In the following there will be explained a case in which plural scanners or printers are connected to the system.

Figure 8:
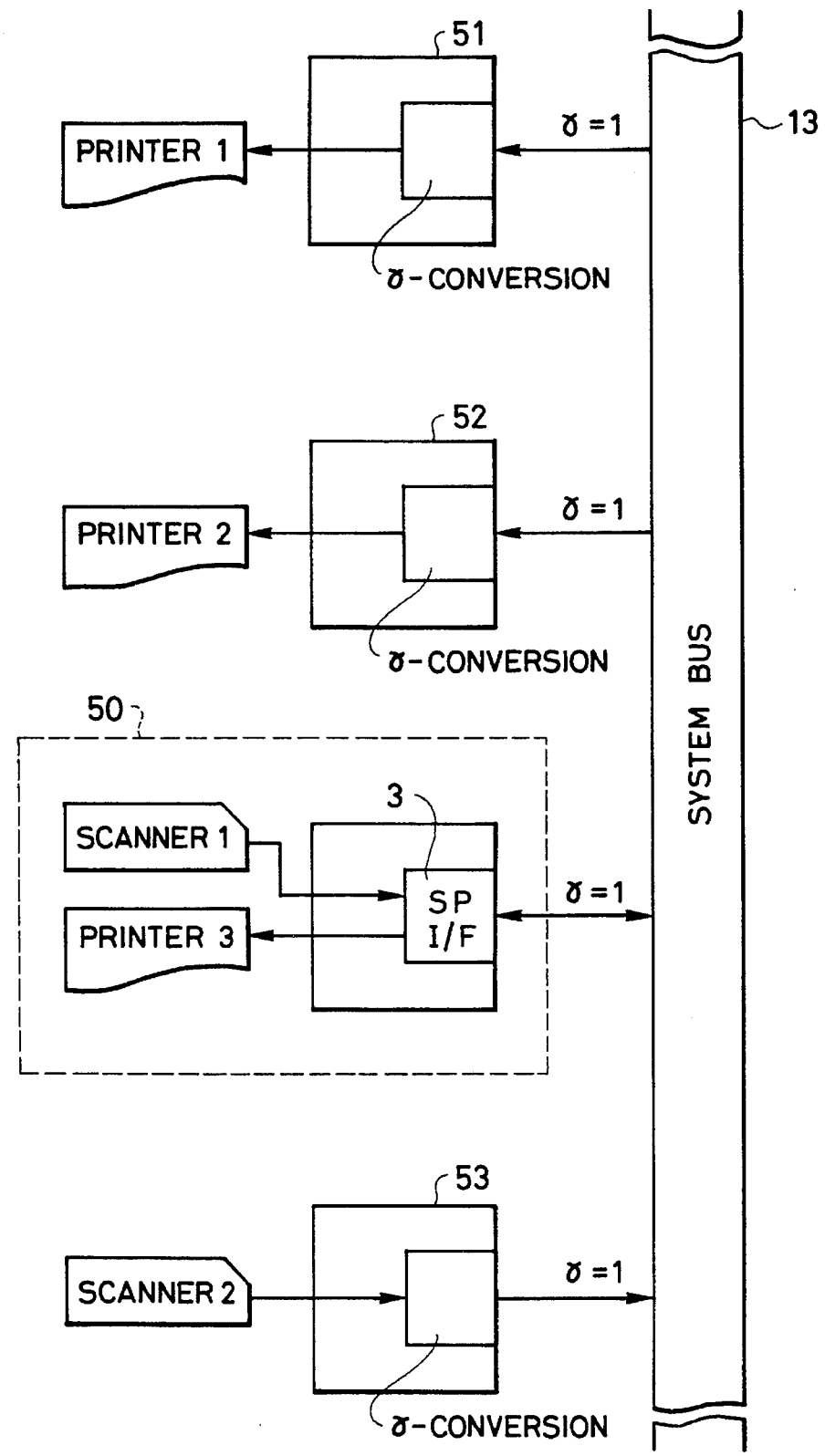
FIG. 8 is a block diagram showing a system in which plural terminals are connected.

FIG. 8 is a block diagram showing the system bus 13 shown in FIG. 2 and plural printers 1, 2, 3 and plural scanners (television cameras) 1, 2 connected thereto. A terminal 50 consisting of the scanner 1 and the printer 3 is equivalent to that shown in FIG. 5. Interfaces 51–53 corresponding to the printers or scanners are respectively provided with gamma correction circuits. Said circuit is equipped with an inverse gamma correction table for the gamma correction for each piece of equipment, in order to achieve a condition γ≈1 (or an imaginary value), thereby providing the system bus constantly with image information of γ≈1 (or an imaginary value).

(Another embodiment)

In FIG. 8, the gamma conversion circuits are provided respectively in the interfaces 51–53. However, if the printers and scanners are connected in fixed manner, the gamma correction tables corresponding to the gamma characteristics thereof may be stored 1 for example in the disk 10 shown in FIG. 2 and transferred in the RAM's of the gamma conversion circuits shown in FIG. 8, when the CPU 4 recognizes the properties of the equipment upon start of power supply or connection of said equipment.

The above-explained tone correction is not limited to the gamma correction for the input and output equipment but also includes the conversion of image density level and range, contrast, etc. In this manner the tone conversion table can be used not only for correction but also for image modification or editing, thereby achieving an improvement in image quality.

In the circuit shown in FIG. 5, the tone correction for the still video camera may also be achieved in the S tone correction circuit of the SP-I/F, as the tone correction table can be equally applied to the scanner and the still video camera.

The system of the present invention is not limited to the foregoing embodiments but may be partially modified or may contain a terminal connected through a local area network, and further includes stand-alone equipment satisfying the function of the present invention. Also, the value of gamma need not be strictly equal to unity but can be substantially equal to unity or equal to another imaginary value.

As explained in the foregoing, the image processing system of the present invention allows one to directly connect input equipment and output equipment for an intermediate tone image in an interface, thereby enabling one to utilize said input and output equipment while a host system is executing another task and thus to improve the efficiency of use of such input and output equipment, and also allows one to transfer the data with a suitable tone characteristic by switching the tone correction table according to whether the on-line or off-line mode is selected.

Also, it is rendered possible to provide the system bus of the image processing system constantly with image information of γ≈1 regardless of the properties of the equipment connected to the system.

It is furthermore rendered possible to switch the tone correction table according to the equipment connected to the system.

We claim:

1. An image processing system which operates in an on-line mode and an off-line mode, comprising:

an input means for inputting image information;

an output means for outputting image information;

a first correction means having a first correction function for correcting the image information input by said input means in accordance with an input-output characteristic of said input means and said output means for providing off-line image information, and a second correction function for providing corrected image information which is independent of the input-output characteristic of said input means;

a memory means for storing the corrected image information provided by said first correction means;

a second correction means for further correcting the stored corrected image information in accordance with an input-output characteristic of said output means for providing on-line image information; and a selection means for providing the off-line image information from said first correction means to said output means when said image processing system is operating in the off-line mode, and when said image processing system is operating in the on-line mode for providing the corrected image information from said first correction means to said memory means for storage, and the on-line image information from said second correction means to said output means.

2. An image processing system according to claim 1, further comprising means for editing the corrected image information stored in said memory means.

3. An image processing system according to claim 1, wherein said first and second correction means has respective correction tables and executes correction operations using their respective correction tables.

4. An image processing system connected to an input apparatus and to an output apparatus, which operates in either one of first and second modes, said system comprising:

first correction means having a first correction function for correcting image information input by the input apparatus in accordance with an input-output characteristic of the input apparatus and the output apparatus for providing off-line image information, and a second correction function for providing corrected image information which is independent of the input-output characteristic of the input apparatus;

memory means for storing the corrected image information provided by said first correction means;

second correction means for further correcting the stored corrected image information in accordance with an input-output characteristic of the output apparatus for providing on-line image information; and selection means for providing the off-line image information from said first correction means to the output apparatus when said image processing system is operating in the second mode, and when said image processing system is operating in the first mode for providing the corrected image information from said first correction means to said memory means for storage, and the on-line image information from said second correction means to the output apparatus.

5. An image processing system according to claim 4, further comprising means for editing the corrected image information stored in said memory means.

6. An image processing system according to claim 4, wherein said first and second correction means have respective correction tables and execute correction operations using their respective correction tables.

7. A method of operating an image processing system in an on-line mode and an off-line mode, comprising the steps of:

inputting image information into said image processing system from an input device;

outputting image information from an output device;

correcting the image information input by said input device, using a first correction device having a first correction function, in accordance with an input-output characteristic of said input device and said output device for providing off-line image information, and a second correction function for providing corrected image information which is independent of the input-output characteristic of said input device;

storing the corrected image information provided by said first correction device in a memory device;

further correcting the stored corrected image information using a second correction device in accordance with an input-output characteristic of said output device for providing on-line image information; and providing the off-line image information, using a selection device, from said first correction device to said output device when said image processing system is operating in the off-line mode, and when said image processing system is operating in the on-line mode for providing the corrected image information from said first correction device to said memory device for storage, and the on-line image information from said second correction device to said output device.

8. The method according to claim 7, including the step of:

editing the corrected image information stored in said memory device.

9. The method according to claim 7, wherein said first and second correction devices have respective correction tables and execute correction operations using their respective correction tables.

10. A method of operating an image processing system connected to an input apparatus and to an output apparatus, which operates in either one of first and second modes, said method comprising the steps of:

correcting image information, using a first correction device having a first correction function, input by the input apparatus in accordance with an input-output characteristic of the input apparatus and the output apparatus for providing off-line image information, and a second correction function for providing corrected image information which is independent of the input-output characteristic of the input apparatus;

storing the corrected image information provided by said first correction device in a memory device;

further correcting the stored corrected image information, using a second correction device, in accordance with an input-output characteristic of the output apparatus for providing on-line image information; and providing the off-line image information, using a selection device, from said first correction device to the output apparatus when said image processing system is operating in the second mode, and when said image processing system is operating in the first mode for providing the corrected image information from said first correction device to said memory device for storage, and the on-line image information from said second correction device to the output apparatus.

11. The method according to claim 10, including the step of:

editing the corrected image information stored in said memory device.

12. The method according to claim 10, wherein said first and second correction devices have respective correction tables and execute correction operations using their respective correction tables.

13. An image processing system which operates in an on-line mode and an off-line mode, comprising:

an input means for inputting information including image information of multivalue digital data;

an output means for outputting image information;

a first correction means having a first correction function for correcting the image information input by said input means in accordance with an input-output characteristic of said input means being different from substantially 1, and said first correction means can directly correct the image information entered by said input means in response to input-output characteristics of said input means and said output means for providing off-line image information, and a second correction function for providing corrected image information which is independent of the input-output characteristic of said input means;

a memory means for storing the corrected image information provided by said first correction means;

a second correction means for further correcting the stored corrected image information in accordance with an input-output characteristic of said output means for providing on-line image information; and a selection means for providing the off-line image information from said first correction means to said output means when said image processing system is operating in the off-line mode, and when said image processing system is operating in the on-line mode for providing the corrected image information from said first correction means to said memory means for storage, and the on-line image information from said second correction means to said output means.

14. A system according to claim 13, further comprising process means for editing the image information stored in said memory means.

15. A system according to claim 13, further comprising process means for processing the image information stored in said memory means.

16. A system according to claim 13, wherein said system is constituted by a plurality of apparatuses.

17. A method of operating an image processing system in an on-line mode and on off-line mode, comprising the steps of:

inputting information including image information of multivalue digital data into said image processing system from an input device;

outputting image information from an output device;

correcting the image information input by said input device, using a first correction device having a first correction function, in accordance with an input-output characteristic of said input device being different from substantially 1, and said first correction device can directly correct the image information entered by said input device in response to input-output characteristics of said input device and said output device for providing off-line image information, and a second correction function for providing corrected image information which is independent of the input-output characteristic of said input device;

storing the corrected image information provided by said first correction device in a memory device;

further correcting the stored corrected image information, using a second correction device, in accordance with an input-output characteristic of said output device for providing on-line image information; and providing the off-line image information, using a selection device, from said first correction device to said output device when said image processing system is operating in the off-line mode, and when said image processing system is operating in the on-line mode for providing the corrected image information from said first correction device to said memory device for storage, and the on-line image information from said second correction device to said output device.

18. An image processing method according to claim 17, further comprising the step of converting the image information being transferred in said transferring step which is as if the input-output characteristic were substantially 1 to image information which is suitable for the output means taking an input-output characteristic of the output means into consideration.

19. A method according to claim 17, further comprising the step of editing the image information stored in said storing step.

20. A method according to claim 17, further comprising the step of processing the image information stored in said storing step.

21. A method according to claim 17, wherein said method is performed in a system comprising a plurality of apparatuses each of which performs said method.

* * * * *

UNITED STATES PATENT AND TRADEMARK OFFICE
CERTIFICATE OF CORRECTION

PATENT NO. : 5,453,845
DATED : September 26, 1995
INVENTOR(S) : HIROSHI NONOSHITA, ET AL.

It is certified that error appears in the above-identified patent and that said Letters Patent is hereby corrected as shown below:

COLUMN 1

Line 5, "applicatino" should read --application--.
Line 23, "such" should read --such an--.

COLUMN 4

Line 44, "However" should read --However,--.
Line 48, "date;" should read --data;--.

COLUMN 6

Line 9, "S" should be deleted.

COLUMN 7

Line 6, "has" should read --have--.
Line 7, "executes" should read --execute--.

UNITED STATES PATENT AND TRADEMARK OFFICE
CERTIFICATE OF CORRECTION

PATENT NO. : 5,453,845
DATED : September 26, 1995
INVENTOR(S) : HIROSHI NONOSHITA, ET AL.

It is certified that error appears in the above-identified patent and that said Letters Patent is hereby corrected as shown below:

<u>COLUMN 9</u>

Line 25, "on" should read --an--.

Signed and Sealed this

Twelfth Day of March, 1996

Attest:

BRUCE LEHMAN

Attesting Officer    Commissioner of Patents and Trademarks